(12) United States Patent
Smith et al.

(10) Patent No.: US 12,276,597 B2
(45) Date of Patent: Apr. 15, 2025

(54) MULTIPLE PATH LENGTH OPTICAL CELL FOR TRACE GAS MEASUREMENT

(71) Applicant: SeekOps Inc., Austin, TX (US)

(72) Inventors: Brendan James Smith, Lakeway, TX (US); Victor Alexander Miller, II, Sonoma, CA (US); James Rutherford, Cypress, TX (US)

(73) Assignee: SeekOps Inc., Austin, TX (US)

( * ) Notice: Subject to any disclaimer, the term of this patent is extended or adjusted under 35 U.S.C. 154(b) by 99 days.

(21) Appl. No.: 17/797,402

(22) PCT Filed: Feb. 5, 2021

(86) PCT No.: PCT/US2021/016821
§ 371 (c)(1),
(2) Date: Aug. 3, 2022

(87) PCT Pub. No.: WO2021/158916
PCT Pub. Date: Aug. 12, 2021

(65) Prior Publication Data
US 2023/0063680 A1    Mar. 2, 2023

Related U.S. Application Data

(60) Provisional application No. 62/970,329, filed on Feb. 5, 2020.

(51) Int. Cl.
*G01N 21/03* (2006.01)
*G01N 21/3504* (2014.01)

(52) U.S. Cl.
CPC ....... *G01N 21/031* (2013.01); *G01N 21/3504* (2013.01)

(58) Field of Classification Search
CPC ............. G01N 21/031; G01N 21/3504; G01N 21/0303

(Continued)

(56) References Cited

U.S. PATENT DOCUMENTS

| 3,780,566 A | 12/1973 | Smith et al. |
| 4,135,092 A | 1/1979 | Milly |

(Continued)

FOREIGN PATENT DOCUMENTS

| AU | 3401499 A | 11/1999 |
| CN | 101470072 A | 7/2009 |

(Continued)

OTHER PUBLICATIONS

International Search Report and Written Opinion for PCT/US23/23905 mailed Oct. 5, 2023.

(Continued)

*Primary Examiner* — Md M Rahman
(74) *Attorney, Agent, or Firm* — Command IP LLP; Michael Zarrabian

(57) ABSTRACT

Systems, devices, and methods including a modified Herriot cell comprising: a laser configured to generate a single beam; a partially transmissive region (PTR) disposed in at least one of: a first mirror and a second mirror, where a first portion of the single beam is received through the PTR, and wherein a second portion of the single beam is reflected by the PTR; a first detector disposed proximate the PTR, wherein the first detector receives the first portion of the beam, and where the first portion of the beam has traveled a first path length from the laser to the first detector; and a second detector disposed proximate the exit hole, where the second detector receives the second portion of the beam, and wherein the second portion of the beam has traveled a second path length from the laser to the second detector.

20 Claims, 9 Drawing Sheets

(58) Field of Classification Search
USPC .......................................................... 356/437
See application file for complete search history.

(56) References Cited

U.S. PATENT DOCUMENTS

| | | |
|---|---|---|
| 4,233,564 A | 11/1980 | Kerbel |
| 4,507,558 A | 3/1985 | Bonne |
| 4,988,833 A | 1/1991 | Lai |
| 5,047,639 A | 9/1991 | Wong |
| 5,075,619 A | 12/1991 | Said |
| 5,173,749 A | 12/1992 | Tell et al. |
| 5,291,265 A | 3/1994 | Kebabian |
| 5,317,156 A | 5/1994 | Cooper et al. |
| 5,767,780 A | 6/1998 | Smith et al. |
| 5,822,058 A | 10/1998 | Adler-Golden et al. |
| 6,064,488 A | 5/2000 | Brand et al. |
| 6,295,859 B1 | 10/2001 | Hayden et al. |
| 6,356,350 B1 | 3/2002 | Silver et al. |
| 6,509,566 B1 | 1/2003 | Wamsley et al. |
| 6,549,630 B1 | 4/2003 | Bobisuthi |
| 7,162,933 B2 | 1/2007 | Thompson et al. |
| 7,800,751 B1 | 9/2010 | Silver et al. |
| 7,833,480 B2 | 11/2010 | Blazewicz et al. |
| 8,060,270 B2 | 11/2011 | Vian et al. |
| 8,294,899 B2 | 10/2012 | Wong |
| 8,451,120 B2 | 5/2013 | Johnson, Jr. et al. |
| 8,730,461 B2 | 5/2014 | Andreussi |
| 9,183,371 B2 | 11/2015 | Narendra et al. |
| 9,183,731 B1 | 11/2015 | Bokhary |
| 9,235,974 B2 | 1/2016 | Johnson, Jr. et al. |
| 9,250,175 B1 | 2/2016 | McManus |
| 9,494,511 B2 | 11/2016 | Wilkins |
| 9,599,529 B1 | 3/2017 | Steele et al. |
| 9,599,597 B1 | 3/2017 | Steele et al. |
| 10,023,311 B2 | 7/2018 | Lai et al. |
| 10,023,323 B1 | 7/2018 | Roberts et al. |
| 10,031,040 B1 | 7/2018 | Smith et al. |
| 10,126,200 B1 | 11/2018 | Steele et al. |
| 10,268,198 B2 | 4/2019 | Mantripragada et al. |
| 10,325,485 B1 | 6/2019 | Schuster |
| 10,365,646 B1 | 7/2019 | Farnsworth et al. |
| 10,429,546 B1 | 10/2019 | Ulmer |
| 10,677,771 B2 | 6/2020 | Dittberner et al. |
| 10,753,864 B2 | 8/2020 | Kasten et al. |
| 10,816,458 B2 | 10/2020 | Kasten et al. |
| 10,830,034 B2 | 11/2020 | Cooley et al. |
| 10,962,437 B1 | 3/2021 | Nottrott et al. |
| 11,105,784 B2 | 8/2021 | Kukreja et al. |
| 11,112,308 B2 | 9/2021 | Kreitinger et al. |
| 11,275,068 B2 | 3/2022 | Willett |
| 11,299,268 B2 | 4/2022 | Christensen et al. |
| 11,519,855 B2 | 12/2022 | Black et al. |
| 11,557,212 B2 | 1/2023 | Hong |
| 11,614,430 B2 | 3/2023 | Buckingham et al. |
| 11,619,562 B2 | 4/2023 | Leen et al. |
| 11,710,411 B2 | 7/2023 | Van Meeteren et al. |
| 11,748,866 B2 | 9/2023 | Vargas |
| 12,015,386 B2 | 6/2024 | Gatabi et al. |
| 2002/0005955 A1 | 1/2002 | Kramer et al. |
| 2003/0160174 A1 | 8/2003 | Grant et al. |
| 2003/0189711 A1 | 10/2003 | Orr et al. |
| 2003/0230716 A1 | 12/2003 | Russell et al. |
| 2004/0012787 A1 | 1/2004 | Galle et al. |
| 2004/0017762 A1 | 1/2004 | Sogawa et al. |
| 2004/0212804 A1 | 10/2004 | Neff et al. |
| 2006/0015290 A1 | 1/2006 | Warburton et al. |
| 2006/0044562 A1 | 3/2006 | Hagene et al. |
| 2006/0232772 A1 | 10/2006 | Silver |
| 2006/0234621 A1 | 10/2006 | Desrochers et al. |
| 2007/0137318 A1 | 6/2007 | Desrochers et al. |
| 2008/0169934 A1 | 7/2008 | Lang et al. |
| 2008/0243372 A1 | 10/2008 | Bodin et al. |
| 2009/0201507 A1 | 8/2009 | Kluczynski et al. |
| 2009/0263286 A1 | 10/2009 | Isomura et al. |
| 2009/0326792 A1 | 12/2009 | McGrath |
| 2010/0004798 A1 | 1/2010 | Bodin et al. |
| 2010/0131207 A1 | 5/2010 | Lippert et al. |
| 2010/0140478 A1 | 6/2010 | Wilson et al. |
| 2010/0147081 A1 | 6/2010 | Thomas |
| 2011/0035149 A1 | 2/2011 | McAndrew et al. |
| 2011/0074476 A1 | 3/2011 | Heer et al. |
| 2011/0150035 A1 | 6/2011 | Hanson et al. |
| 2011/0164251 A1 | 7/2011 | Richter |
| 2011/0213554 A1 | 9/2011 | Archibald et al. |
| 2011/0242659 A1 | 10/2011 | Eckles et al. |
| 2011/0257944 A1 | 10/2011 | Du et al. |
| 2012/0120397 A1 | 5/2012 | Furtaw et al. |
| 2013/0044314 A1 | 2/2013 | Koulikov et al. |
| 2013/0076900 A1 | 3/2013 | Mrozek et al. |
| 2013/0208262 A1 | 8/2013 | Andreussi |
| 2014/0172323 A1 | 6/2014 | Marino |
| 2014/0204382 A1 | 7/2014 | Christensen |
| 2014/0236390 A1 | 8/2014 | Mohamadi |
| 2014/0336957 A1 | 11/2014 | Hanson et al. |
| 2015/0072633 A1 | 3/2015 | Massarella et al. |
| 2015/0145954 A1 | 5/2015 | Pulleti et al. |
| 2015/0226575 A1 | 8/2015 | Rambo |
| 2015/0275114 A1 | 10/2015 | Tumiatti et al. |
| 2015/0295543 A1 | 10/2015 | Brown et al. |
| 2015/0316473 A1 | 11/2015 | Kester et al. |
| 2015/0323449 A1 | 11/2015 | Jones et al. |
| 2015/0336667 A1 | 11/2015 | Srivastava et al. |
| 2016/0018373 A1 | 1/2016 | Pagé et al. |
| 2016/0070265 A1 | 3/2016 | Liu et al. |
| 2016/0104250 A1 | 4/2016 | Allen et al. |
| 2016/0146696 A1 | 5/2016 | Steele et al. |
| 2016/0161456 A1 | 6/2016 | Risk et al. |
| 2016/0202225 A1 | 7/2016 | Feng et al. |
| 2016/0214715 A1 | 7/2016 | Meffert |
| 2016/0307447 A1 | 10/2016 | Johnson et al. |
| 2016/0357192 A1 | 12/2016 | McGrew et al. |
| 2017/0003684 A1 | 1/2017 | Knudsen |
| 2017/0057081 A1 | 3/2017 | Krohne et al. |
| 2017/0089829 A1 | 3/2017 | Bartholomew et al. |
| 2017/0093122 A1 | 3/2017 | Bean et al. |
| 2017/0097274 A1 | 4/2017 | Thorpe et al. |
| 2017/0115218 A1 | 4/2017 | Huang et al. |
| 2017/0134497 A1 | 5/2017 | Harter et al. |
| 2017/0158353 A1 | 6/2017 | Schmick |
| 2017/0199647 A1 | 7/2017 | Richman et al. |
| 2017/0206648 A1 | 7/2017 | Marra et al. |
| 2017/0235018 A1 | 8/2017 | Foster et al. |
| 2017/0259920 A1 | 9/2017 | Lai et al. |
| 2017/0290034 A1 | 10/2017 | Desai et al. |
| 2017/0307519 A1 | 10/2017 | Black et al. |
| 2017/0336281 A1 | 11/2017 | Waxman et al. |
| 2017/0339820 A1 | 11/2017 | Foster et al. |
| 2018/0023974 A1 | 1/2018 | Otani et al. |
| 2018/0024091 A1 | 1/2018 | Wang et al. |
| 2018/0045561 A1 | 2/2018 | Leen et al. |
| 2018/0045596 A1 | 2/2018 | Prasad et al. |
| 2018/0050798 A1 | 2/2018 | Kapuria |
| 2018/0059003 A1 | 3/2018 | Jourdainne |
| 2018/0067066 A1 | 3/2018 | Giedd et al. |
| 2018/0109767 A1 | 4/2018 | Li et al. |
| 2018/0122246 A1 | 5/2018 | Clark |
| 2018/0127093 A1 | 5/2018 | Christensen et al. |
| 2018/0188129 A1 | 7/2018 | Choudhury et al. |
| 2018/0259955 A1 | 9/2018 | Noto |
| 2018/0266241 A1 | 9/2018 | Ferguson et al. |
| 2018/0266946 A1 | 9/2018 | Kotidis et al. |
| 2018/0209902 A1 | 10/2018 | Myshak et al. |
| 2018/0284088 A1 | 10/2018 | Verbeck, IV |
| 2018/0292374 A1 | 10/2018 | Dittberner et al. |
| 2018/0321692 A1 | 11/2018 | Castillo-Effen et al. |
| 2018/0322699 A1 | 11/2018 | Gray et al. |
| 2019/0011920 A1 | 1/2019 | Heinonen et al. |
| 2019/0011935 A1 | 1/2019 | Ham et al. |
| 2019/0025199 A1 | 1/2019 | Koulikov |
| 2019/0033194 A1 | 1/2019 | DeFreez et al. |
| 2019/0049364 A1 | 2/2019 | Rubin |
| 2019/0077506 A1 | 3/2019 | Shaw et al. |
| 2019/0086202 A1 | 3/2019 | Guan et al. |
| 2019/0095687 A1 | 3/2019 | Shaw et al. |

(56) References Cited

U.S. PATENT DOCUMENTS

| | | |
|---|---|---|
| 2019/0154874 A1 | 5/2019 | Shams et al. |
| 2019/0178743 A1 | 6/2019 | McNeil |
| 2019/0195789 A1 | 6/2019 | Pan et al. |
| 2019/0204189 A1 | 7/2019 | Mohr, Jr. et al. |
| 2019/0212419 A1 | 7/2019 | Jeong et al. |
| 2019/0220019 A1 | 7/2019 | Tan et al. |
| 2019/0228573 A1 | 7/2019 | Sen et al. |
| 2019/0234868 A1 | 8/2019 | Tanomura et al. |
| 2019/0331652 A1 | 10/2019 | Ba et al. |
| 2020/0050189 A1 | 2/2020 | Gu et al. |
| 2020/0065433 A1 | 2/2020 | Duff et al. |
| 2020/0109976 A1 | 4/2020 | Ajay et al. |
| 2020/0135036 A1 | 4/2020 | Campbell |
| 2020/0182779 A1 | 6/2020 | Kasten et al. |
| 2020/0249092 A1 | 8/2020 | Podmore et al. |
| 2020/0373172 A1 | 11/2020 | Suzuki |
| 2020/0400635 A1 | 12/2020 | Potyrailo et al. |
| 2021/0017926 A1 | 1/2021 | Alkadi et al. |
| 2021/0037197 A1 | 2/2021 | Kester et al. |
| 2021/0055180 A1 | 2/2021 | Thorpe et al. |
| 2021/0109074 A1 | 4/2021 | Smith et al. |
| 2021/0140934 A1 | 5/2021 | Smith et al. |
| 2021/0190745 A1 | 6/2021 | Buckingham et al. |
| 2021/0190918 A1 | 6/2021 | Li et al. |
| 2021/0199565 A1 | 7/2021 | John et al. |
| 2021/0247369 A1 | 8/2021 | Nottrott et al. |
| 2021/0255158 A1 | 8/2021 | Smith et al. |
| 2021/0300591 A1 | 9/2021 | Tian |
| 2021/0321174 A1 | 10/2021 | Sun et al. |
| 2021/0364427 A1 | 11/2021 | Smith et al. |
| 2021/0382475 A1 | 12/2021 | Smith et al. |
| 2022/0082495 A1 | 3/2022 | Kreitinger et al. |
| 2022/0113290 A1 | 4/2022 | Smith et al. |
| 2022/0170810 A1 | 6/2022 | Miller, II et al. |
| 2022/0268952 A1 | 8/2022 | Liang et al. |
| 2022/0341806 A1 | 10/2022 | Miller et al. |
| 2022/0357231 A1 | 11/2022 | Nahata et al. |
| 2023/0194487 A1 | 6/2023 | Buckingham et al. |
| 2023/0213413 A1 | 7/2023 | Mohr, Jr. et al. |
| 2023/0274651 A1 | 8/2023 | McGuire et al. |
| 2023/0392498 A1 | 12/2023 | Srivastav et al. |

FOREIGN PATENT DOCUMENTS

| | | |
|---|---|---|
| CN | 104458588 A | 3/2015 |
| CN | 205749271 U | 11/2016 |
| CN | 106568516 A | 4/2017 |
| CN | 106769977 A | 5/2017 |
| CN | 107703075 A | 2/2018 |
| CN | 109780452 A | 5/2019 |
| CN | 211508182 U | 9/2020 |
| CN | 112213443 A | 1/2021 |
| DE | 29601472 U1 | 5/1996 |
| DE | 69333010 | 4/2004 |
| DE | 102014013822 A1 | 3/2016 |
| EP | 0450809 A2 | 10/1991 |
| EP | 1371962 B1 | 7/2011 |
| EP | 3339855 A1 | 6/2018 |
| FR | 3047073 A1 | 7/2017 |
| FR | 3047073 B1 | 8/2019 |
| GB | 2538563 A | 11/2016 |
| JP | H08247939 A | 9/1996 |
| JP | 200975823 A | 4/2009 |
| KR | 20170062813 A | 6/2017 |
| KR | 101770254 B1 | 8/2017 |
| TW | 522226 B | 3/2003 |
| WO | 1999054700 A2 | 10/1999 |
| WO | 02066950 A1 | 8/2002 |
| WO | 2008021311 A2 | 2/2008 |
| WO | 2015073687 A1 | 5/2015 |
| WO | 2016045791 A1 | 3/2016 |
| WO | 2016162673 A1 | 10/2016 |
| WO | 2017069979 A1 | 4/2017 |
| WO | 2018121478 A1 | 7/2018 |
| WO | 2018227153 A1 | 12/2018 |
| WO | 2019246280 A1 | 12/2019 |
| WO | 2020007684 A1 | 1/2020 |
| WO | 2020028353 A1 | 2/2020 |
| WO | 2020086499 A1 | 4/2020 |
| WO | 2020206006 A1 | 10/2020 |
| WO | 2020206008 A1 | 10/2020 |
| WO | 2020206020 A1 | 10/2020 |
| WO | 2021055902 A1 | 3/2021 |
| WO | 2021158916 A1 | 8/2021 |
| WO | 2022093864 A1 | 5/2022 |
| WO | 2022211837 A1 | 10/2022 |

OTHER PUBLICATIONS

Lilian Joly, The evolution of AMULSE (Atmospheric Measurements by Ultra-Light Spectrometer) and its interest in atmospheric applications. Results of the Atmospheric Profiles of GreenhousE gasEs (APOGEE) weather balloon release campaign for satellite retrieval validation, p. 1-28, Sep. 25, 2019, Atmospheric Measurement Techniques Discussion (Joly).

Cabreira et al. "Survey on Coverage Path Planning with Unmanned Aerial Vehicles", published: Drones, published: Jan. 2019, pp. 1-38, year 2019.

U.S. Appl. No. 62/687,147, filed Jun. 19, 2018, Brendan James Smith, Entire Document.

"Safesite Multi-Threat Detection System", Jul. 11, 2012 (Jul. 11, 2012), pp. 1-6, XP055245980.

International Search Report and Written Opinion for PCT/US19/38011 mailed Sep. 9, 2019.

International Search Report and Written Opinion for PCT/US19/38015, mailed Oct. 18, 2019.

International Search Report and Written Opinion for PCT/US19/44119, mailed Oct. 17, 2019.

International Search Report and Written Opinion for PCT/US20/26228 mailed Jul. 1, 2020.

International Search Report and Written Opinion for PCT/US20/26232 mailed Jun. 26, 2020.

International Search Report and Written Opinion for PCT/US20/26246 mailed Jun. 29, 2020.

International Search Report and Written Opinion for PCT/US20/51696, mailed Feb. 3, 2021.

International Search Report and Written Opinion for PCT/US2020/044978, mailed Oct. 26, 2020.

International Search Report and Written Opinion for PCT/US2021/016821 mailed Apr. 26, 2021.

International Search Report and Written Opinion for PCT/US2021/024177, mailed Jun. 23, 2021.

International Search Report and Written Opinion for PCT/US2021/056708, mailed Jan. 27, 2022.

International Search Report and Written Opinion for PCT/US21/42061, mailed Nov. 26, 2021.

International Search Report and Written Opinion for PCT/US21/44532, mailed Jan. 11, 2022.

International Search Report and Written Opinion for PCT/US21/56710, mailed Feb. 23, 2022.

International Search Report and Written Opinion of PCT/US19/57305, mailed Jan. 2, 2020.

International Search Report and Written Opinion of PCT/US20/54117, mailed Dec. 22, 2020.

Joly, "Atmospheric Measurements by Ultra-Light Spectrometer (AMULSE) Dedicated to Vertical Profile In Situ Measurements of Carbon Dioxide ($CO_2$) Under Weather Balloons: Instrumental Development and Field Application," Sensors 2016, 16, 1609.

Khan, "Low Power Greenhouse Gas Sensors for Unmanned Aerial Vehicles", Remote Snse. 2012, 4, 1355-1368.

Villa. "An Overview of Small Unmanned Aerial Vehicles for Air Quality Measurements: Present Applications and Future Prospectives". Sensors. Web . Jul. 12, 2016.

White, "Development of an Unmanned Aerial Vehicle for the Measurement of Turbulence in the Atmospheric Boundary Layer", Atmosphere, v.8, issue 10, 195, pp. 1-25.

(56) References Cited

OTHER PUBLICATIONS

Feng, Lingbing, Nowak, Gen, O'Neill, T.J., Welsh, A.H. "Cutoff; A spatio-temporal imputation method." Journal of Hydrology 519 (2014) : 3591-3605 (Year:2014).
Clilverd, Mark A. et al., Energetic particle injection, acceleration, and loss during the geomagnetic disturbances which upset Galaxy 15, Journal of Geophysical Research, vol. 117, A12213, doi: 10.1029/2012JA018175, 2012, pp. 1-16 (Year:2012).
Kern, Christoph et al., Spatial Distribution of Halogen Oxides in the Plume of Mount Pagan Volcano, Mariana Islands, Geophysical Research Letters 10.1029/2018GL079245, Sep. 27, 2018, pp. 9588-9596 (Year:2018).
Liao, J. et al. Observations of Inorganic bromine(HOBr, BrO, and Br2) speciation at Barrow, Alaska in spring 2009, Journal of Geophysical Research, vol. 117, D00R16, doi:10.1029/2011JD016641, 2012, pp. 1-11 (Year:2012).
Liu, Siwen et al., Development of a UAV-Based System to Monitor Air Quality over an Oil Field, Montana Technological University, Montana tech Library Digital Commons @ Montana Tech Graduate Theses & Non-Theses, Fall 2018, pp. 1-85 (Year:2018).
Miyama, Toru et al., Estimating allowable carbon emission for CO2 concentration stabilization using a GCM-based Earth system model, Geophysical Research Letters, vol. 36,L19709, doi:10.1029/2009GL039678, 2009, pp. 0094-8276 (Year:2009).
Oppenheimer Clive et al., Ultraviolet Sensing of Volcanic Sulfur Emissions, Elements (An Internatioknal Magazine of Mineralogy, Geochemistry, and Petrology), Apr. 2010, vol. 6, pp. 87-92 (Year: 2010).
Parazoo, Nicholas C. et al., Interpreting seasonal changes in the carbon balance of southern Amazonia using measurements of XCO2 and chlorophyll fluorescence from GOSAT, Geophysical Research Letters, vol. 40.2829-2833, doi: 10.1002/grl.50452, 2013 pp. 0 2829-2833 (Year:2013).
Queiber, Manuel et al., A new frontier in CO2 flux measurements using a highly portable DIAL laser system, Scientific Reports, DOI: 10.1038/srep33834 1, Sep. 22, 2016, pp. 1-13(Year:2016).
Queiber, Manuel et al., Large-area quantification of subaerial CO2 anomalies with portable laser remote sensing and 2d tomography, The Leading Edge Mar. 2018, pp. 306-313 (Year:2018).
IEEE Conference Paper, "Research of the high pressure jet performance of small size nozzle," ISBN :978-1-5090-1087-5,Publication Date : Oct. 1, 2016, Conference dates Oct. 10, 2016 thru Oct. 12, 2016.[retrieved from the Internet] on Sep. 1, 2023 at 4:14pm.
International Search Report and Written Opinion for PCT/US23/13893, mailed Jun. 30, 2023.
Development of a mobile tracer correlation method for assessment of air emissions from landfills and other area sources, Atmospheric Environment 102 (2015) 323-330. T.A. Foster-Wittig et. al. 2015.
Measurements of Methane Emissions from Landfills Using a Time Correlation Tracer Method Based on FTIR Absorption Spectroscopy, Environ. Sci. Technol. 2001, 35, 21-25, B. Galle et. al. 2001.
Uehara, K: "Dependence of harmonic signals 1-15 on sample-gas parameters in wavelength-modulation spectroscopy for precise absorption measurements", Applied Physics B, Springer Berlin Heidelberg, Berlin/Heidelberg, vol. 67, Jan. 2, 1998, pp. 517-523, XP007921671, ISSN:0946-2171, DOI: 10.1007/S003400050537.
International Search Report and Written Opinion for PCT/US22/38951, mailed Nov. 28, 2022.
Kelly J F et al. "A capillary absorption spectrometer for stable carbon isotope ratio (C/C) analysis in very small samples", Review of Scientific Instruments, American Institute of Physics, 2 Huntington Quadrangle, Melville, NY 11747, vol. 83, No. 2, Feb. 1, 2012 (Ffeb. 1, 2012), pp. 23101-23101, XP012161835, ISSN: 0034-6748, DOI: 10.1063/1.3680593.
Krings et al., Atmos. Meas. Tech., 11, 721-739, Feb. 7, 2018.
International Search Report and Written Opinion for PCT/US2023/023933 mailed Sep. 26, 2023.
Tao Lei et al:"Low-power, open-path mobile sensing platform for high-resolution measurements of greenhouse gases and air pollutants", Applied Physics B, Springer Berlin Heidelberg, Berlin/Heidelberg, vol. 119, No. 1, Mar. 10, 2015 (Mar. 10, 2015), pp. 153.-164, XP035445836, ISSN: 0946-2171, DOI:10.1007/S00340-015-6069-1 [retrieved on Mar. 10, 2015].
Tarsitano C G et al: Multilaser Herriott Cell for Planetary Tunable Laser Spectrometers, Applied Optics , Optical Society of America, Washington, DC, US, vol. 46, No. 28, Oct. 1, 2007 (Oct. 1, 2007), pp. 6923-6935, XP001508502, ISSN:0003-6935, DOI: 10.1364/AO.46.006923.
Field Trial of Methane Emission Quantification Technologies, Society of Petroleum Engineers, SPE-201537-MS, Allen et al., Oct. 2020.
Adame J A et al: "Application of cluster analysis to surface ozone, NOand SOdaily patterns in an industrial area in Central-Southern Spain measured with a DOAS system", Science of the Total Environment, Elsevier, Amsterdam, NL, vol. 429, Apr. 11, 2012 (Apr. 11, 2012), pp. 281-291, XP028491183, ISSN: 0048-9697, DOI: 10.1016/J.SCITOTENV.2012.04.032.
Coombes et al, "Optimal Polygon Decomposition for UAV Survey Coverage Path Planning in Wind", published: Jul. 2018, publisher: 'Sensors' (Year:2018).
He et al. "Static Targets' Track Path for UAVs Meeting the Revisit Interval Requirement", published :2013, publisher : IEEE (Year:2013).
Day, S., and et al. "Characterisation of regional fluxes of methane in the Surat Basin, Queensland, Phase 1: A review and analysis of literature on methane detection and flux determination." (2013) (Year: 2013).

MULTIPLE PATH LENGTH OPTICAL CELL FOR TRACE GAS MEASUREMENT

CROSS-REFERENCE TO RELATED APPLICATION

This application is a 35 U.S.C § 371 National Stage Entry of International Application No. PCT/US2021/016821, filed Feb. 5, 2021, which claims the priority benefit of U.S. Provisional Patent Application Ser. No. 62/970,329 filed Feb. 5, 2020, all of which are incorporated herein by reference in its their entirety for all purposes.

FIELD OF ENDEAVOR

The invention relates generally to gas detection, and more particularly to spectroscopic gas sensing.

BACKGROUND

Gas detection sensors are typically limited in their range of detecting gasses. Increasing an upper limit for detection may also cause the lower limit to increase. Similarly, decreasing a lower limit for detection may also cause the upper limit to decrease. Methane (CH4) is an odorless and colorless naturally occurring organic molecule, which is present in the atmosphere at average ambient levels of approximately 1.85 ppm as of 2018 and is projected to continually climb. While methane is found globally in the atmosphere, a significant amount is collected or "produced" through anthropogenic processes including exploration, extraction, and distribution of petroleum in the form of natural gas. Natural gas, an odorless and colorless gas, is a primary source of energy used to produce electricity and heat. The main component of natural gas is methane (93.9 mol % CH4 typ.). While extraction of natural gas is a large source of methane released to atmosphere, major contributors of methane also include livestock farming (enteric fermentation), and solid waste and wastewater treatment (anaerobic digestion). Optical cells may be used to detect methane and other trace gasses.

SUMMARY

A system embodiment may include: a modified Herriot cell comprising: a laser configured to generate a single beam; a partially transmissive facet (PTF) disposed in at least one of: a first mirror and a second mirror, where a first portion of the single beam may be received through the PTF, and where a second portion of the single beam may be reflected by the PTF; a first detector disposed proximate the PTF, where the first detector receives the first portion of the beam, and where the first portion of the beam has traveled a first path length from the laser to the first detector; and a second detector disposed proximate the exit hole, where the second detector receives the second portion of the beam, and where the second portion of the beam has traveled a second path length from the laser to the second detector.

In additional system embodiments, the modified Herriot cell further comprises: an inlet hole disposed in at least one of: the first mirror and the second mirror. In additional system embodiments, the laser may be disposed proximate the inlet hole, and where the single beam passes through the inlet hole. In additional system embodiments, the modified Herriot cell further comprises: an exit hole disposed in at least one of: the first mirror and the second mirror. In additional system embodiments, the single beam passes through the exit hole to the second detector.

Additional system embodiments may include: one or more analog amplifiers configured to amplify a first analog signal from the first detector and a second analog signal from the second detector. Additional system embodiments may include: one or more analog to digital converters configured to convert the first amplified signal to a first digital signal and the second amplified signal to a second digital signal. Additional system embodiments may include: a processor having addressable memory, the processor configured to: receive the first digital signal and the second digital signal; and determine a presence of a trace gas of one or more trace gases based on a lower detection limit of the first digital signal and an upper detection limit of the second digital signal. In additional system embodiments, the lower detection limit of the first digital signal and the upper detection limit of the second digital signal provides a high dynamic range (HDR) for detecting the presence of the trace gas of the one or more trace gasses. In additional system embodiments, the detected trace gas comprises at least one of: hydrogen disulfide, methane, sulfur oxide, carbon dioxide, and nitrogen oxide.

Additional system embodiments may include: a processor having addressable memory, the processor configured to: receive the first digital signal and the second digital signal; determine a reference level from the first digital signal; normalize the second digital signal based on the determined reference level; and determine a presence of a trace gas of one or more trace gases based on the normalized second digital signal. In additional system embodiments, an inner surface of the first mirror and an inner surface of the second mirror may be concave. In additional system embodiments, the first path length may be shorter than the second path length. In additional system embodiments, the first detector and the second detector may be photodetectors.

A method embodiment may include: generating a single beam from a laser, where the single beam enters a modified Herriot cell through an inlet hole; receiving a first portion of the beam through a partially transmissive facet (PTF) by a first detector, where the first portion of the beam has traveled a first path length from the laser to the first detector; reflecting a second portion of the single beam by the PTF; and receiving the second portion of the beam through an exit hole by a second detector, where the second portion of the beam has traveled a second path length from the laser to the second detector.

Additional method embodiments may further include: amplifying a first analog signal from the first detector and a second analog signal from the second detector via an analog amplifier. Additional method embodiments may further include: converting the first amplified signal to a first digital signal and the second amplified signal to a second digital signal via analog to digital converters. Additional method embodiments may further include: determining a presence of a trace gas of one or more trace gases based on a lower detection limit of the first digital signal and an upper detection limit of the second digital signal.

Another method embodiment may include: generating a single beam from a laser, where the single beam enters a modified Herriot cell through an inlet hole; receiving a first portion of the beam through a partially transmissive facet (PTF) by a first detector, where the first portion of the beam has traveled a first path length from the laser to the first detector; determining a reference level from the first detector; reflecting a second portion of the single beam by the PTF; receiving the second portion of the beam through an exit hole by a second detector, where the second portion of the beam has traveled a second path length from the laser to the second detector; and determining an analog signal from the second detector. Additional method embodiments may further include: normalizing the analog signal based on the determined reference level; determining a presence of a trace gas of one or more trace gases based on the normalized analog signal.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
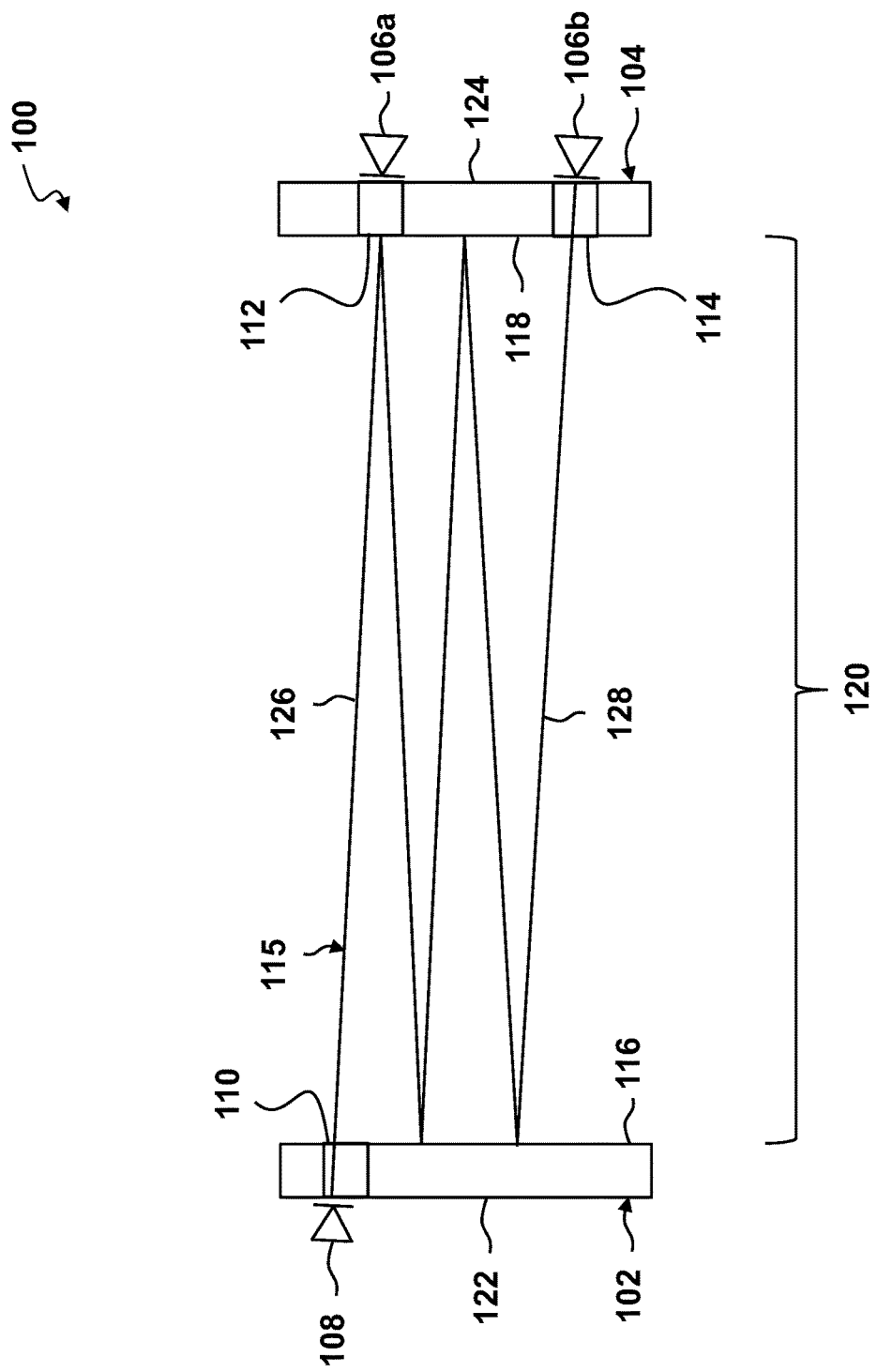
FIG. 1 depicts a side cross-sectional view of a gas sensor with a partially transmissive facet (PTF), according to one embodiment.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The disclosed system and method provides a gas sensor with multiple path lengths. This gas sensor may have a high dynamic range (HDR) in some embodiments. The disclosed gas sensor may have both a decreased lower detection limit and an increased upper detection limit achieved through a single beam source and two or more detectors. In some embodiments, the gas sensor may be a modified Herriot cell having two concave mirrors aligned in such a manner as to reflect the single beam, such as light from a laser, in a circular or elliptical pattern. The modified Herriot cell may have an inlet hole in one of the concave mirrors proximate the single beam, a partially transmissive facet (PTF) in one of the concave mirrors proximate the first detector, and an exit hole in one of the concave mirrors proximate a second detector.

A second portion of the beam may be reflected by the PTF while a first portion of the beam may pass through the PTF to the first detector. The second portion of the single beam reaches the second detector after traveling a longer second path length and so is able to provide a decreased lower detection limit. The first portion of the single beam reaches the first detector after traveling a shorter first path length and so is able to provide an increased upper detection limit. The decreased lower detection limit provided by the second detector and the increased upper detection limit provided by the first detector provide a high dynamic range (HDR) for detecting gasses such as hydrogen disulfide, methane, sulfur oxide, carbon dioxide, and/or nitrogen oxide.

Trace gas sensors may be used to detect and quantify leaks of toxic gases, e.g., hydrogen disulfide, and/or environmentally damaging gases, e.g., methane and sulfur dioxide, in a variety of industrial and environmental contexts. Detection and quantification of these leaks are of interest to a variety of industrial operations, e.g., oil and gas, chemical production, and painting, as well as environmental regulators for assessing compliance and mitigating environmental and safety risks.

Certain applications of leak detection, such as detecting a gas that is both toxic in low concentrations and explosive in high concentrations, may require sensors capable of accurately quantifying gas concentration over multiple orders of magnitude. These sensing applications over multiple orders of magnitude require a high dynamic range (HDR) of sensitivity.

Spectroscopic gas sensing techniques rely on the ability to detect a reduction in a transmission of a light pitched across an optical cell. This deficit in transmitted light may be detected on a detector such as a photodetector. An analog signal from the detector may be amplified and converted into a digital signal.

The lower detection limit of the detector may be limited by the path length of the optical cell, noise in the detector, and noise from a laser generating the light. The longer the path length, the lower the detection limit. A Herriot cell is an optical cell that uses two concave mirrors precisely aligned to reflect a beam in a circular or elliptical pattern, which increases the path length an integer multiple of the distance between the two mirrors. As reflections in the cell are increased, the path length becomes longer and the lower detection limit is decreased.

The upper detection limit of the detector is a function of the number of incident photons pitched into the cell, the noise floor of the detector, and the bit depth of the analog-to-digital conversion process. If the path length is very long, the absorbing molecule will block so much light that none can be detected above the noise floor of the detector. Therefore, a detector with a very low detection limit will typically be limited in its upper detection limit, limiting the sensor's utility in certain applications.

FIG. 1 depicts a side cross-sectional view of a gas sensor 100 with a partially transmissive facet (PTF) 112, according to one embodiment. In some embodiments, the gas sensor 100 may be a modified Herriot cell mirror system for optical gas sensing. The gas sensor 100 may include a first mirror 102, a second mirror 104, a first detector 106a, a second detector 106b, a laser 108, an inlet hole 110 for a beam 112 of the laser 108, the PTF 112, and an exit hole 114 for the beam 115 of the laser 108.

In one embodiment, the first mirror 102 may have a first concave inner reflective surface 116. In additional embodiments, the second mirror 104 may have a second concave inner reflective surface 118. The mirrors 102, 104 may be aligned such that the first concave inner reflective surface 116 of the first mirror 102 faces the second concave inner reflective surface 118 of the second mirror 104 with a gap 120 therebetween.

The laser 108 may be disposed behind the first mirror 102 and proximate the inlet hole 110. The laser 108 may also be proximate a first rear surface 122 of the first mirror 102 or a second rear surface 124 of the second mirror 104. In some embodiments, the first rear surface 122 and/or the second rear surface 124 may be a flat surface. In another embodiment, the rear surface may be another shape, such as a concave or convex shape. The first detector 106a may be proximate the PTF 112. The first detector 106a may be proximate the first rear surface 122 and/or the second rear surface 124. The second detector 106b may be proximate the exit hole 114. The first detector 106a may be proximate the first rear surface 122 and/or the second rear surface 124. In some embodiments, the first detector 106a may be proximate the second detector 106b on a same side of the gas sensor 100. In other embodiments, the first detector 106a may be distal from the second detector 106b with each detector 106a, 106b on opposite sides of the gas sensor 100. In some embodiments, the laser 108 may be on a same side of the gas sensor 100 as the one or more detectors 106a, 106b. In other embodiments, the laser 108 may be on an opposite side of the gas sensor 100 as the one or more detectors 106a, 106b.

The beam 115 of light of a specific wavelength, $\lambda_1$, may be emitted from the laser 108 and travel on a first path length 126 from the laser 108, through the inlet hole 110, through the PTF 112, and to the first detector 106a. While the first path length 126 is depicted as traveling directly through the first mirror 102 and through the second mirror 104, the first path length 126 may include one or more reflections between the mirrors 102, 104 prior to reaching the first detector 106a. The beam 115 of light may also travel on a second path length 128 from the laser 108, through the inlet hole 110, reflecting off of the PTF 112, reflecting off of the mirrors 102, 104 one or more times, through the exit hole 114, and to the second detector 106b.

The first detector 106a may be located proximate the PTF 112. The PTF 112 may be located at a location of a reflection in the Herriot cell. A second portion of the beam 115 may be reflected by the PTF 112. A first portion of the beam 115 may pass through the PTF 112 to the first detector 106a after the beam 115 has traveled the set first path length 126. The second portion of the beam 115 that is reflected continues on the set second path length 128 until it is received by the second detector 106b. The first detector 106a may be a photodetector. The first detector 106a may be configured to detect hydrogen disulfide, methane, sulfur oxide, carbon dioxide, and/or nitrogen oxide. The first detector 106a may detect a reduction in a transmission of light from the beam 115 as it is pitched across the modified Herriot cell in the set first path length 126. The shorter set first path length 126 results in both an increased lower detection limit and an increased upper detection limit for the first detector 106a.

The second detector 106b may be located proximate the exit hole 114 in one of the mirrors 102, 104 of the modified Herriot cell. The exit hole 114 may be proximate a location on one of the mirrors that the beam 115 passes through after the beam has traveled the set second path length 128. The second detector 106b may be a photodetector. The second detector 106b may be configured to detect hydrogen disulfide, methane, sulfur oxide, carbon dioxide, and/or nitrogen oxide. The second detector 106b may detect a reduction in a transmission of light from the beam 115 as it is pitched across the modified Herriot cell in the set second path length 128. An increased set second path length results in both a decreased lower detection limit and a decreased upper detection limit for the second detector 106b.

As an example, if the modified Herriot cell has a gap 120 that is 10 cm and it is designed to nominally use nineteen reflections, then the second path length 128 is actually 200 cm. The number of trips across the cell is 19+1, multiplied by 10 cm per trip, which yields 200 cm. If the PTF 112 is located at the first reflection in the cell, then the first detector 106a located behind the PTF 112 will see light that has only travelled 10 cm, which yields the first path length 126 having a 20× reduction in path length as compared to the second path length 128. Since absorbance is linearly proportional to path length (absorbance, alpha, equal k_nu*L), the upper detection limit may, nominally with all else held constant, increase by a factor of twenty.

The PTF 112 may be placed behind any reflection within the modified Herriot cell, and the transmissivity of the facet may be chosen to determine the most advantageous location, depending on the application and details of the supporting hardware, such as the detectors 106a, 106b; laser 108, analog-to-digital converters, and the like. The upper detection limit may be dictated in large part by a power of the laser 108. Passing more power through the PTF 112 earlier in the modified Herriot cell will favor a greater upper detection limit. Care must be taken to ensure that there is sufficient power through the second path length such that the lower limit is not compromised by approaching the noise floor of the second detector 106b.

In some embodiments, the first path length 126 may be used as an independent reference path. In such an embodiment, the first path length 126 may have little to no methane measurement portion and the first detector 106a could then be used to normalize the signal of the second path length 128 as measured at the second detector 106b. In some embodiments, two path length 126, 128 sensors may pass one path through the trace gas, while the reference path is passed through a cell that doesn't contain the gas. However, a short first path length 126 relative to the measurement second path length 128 can reasonably represent a background reference level.

Figure 2:
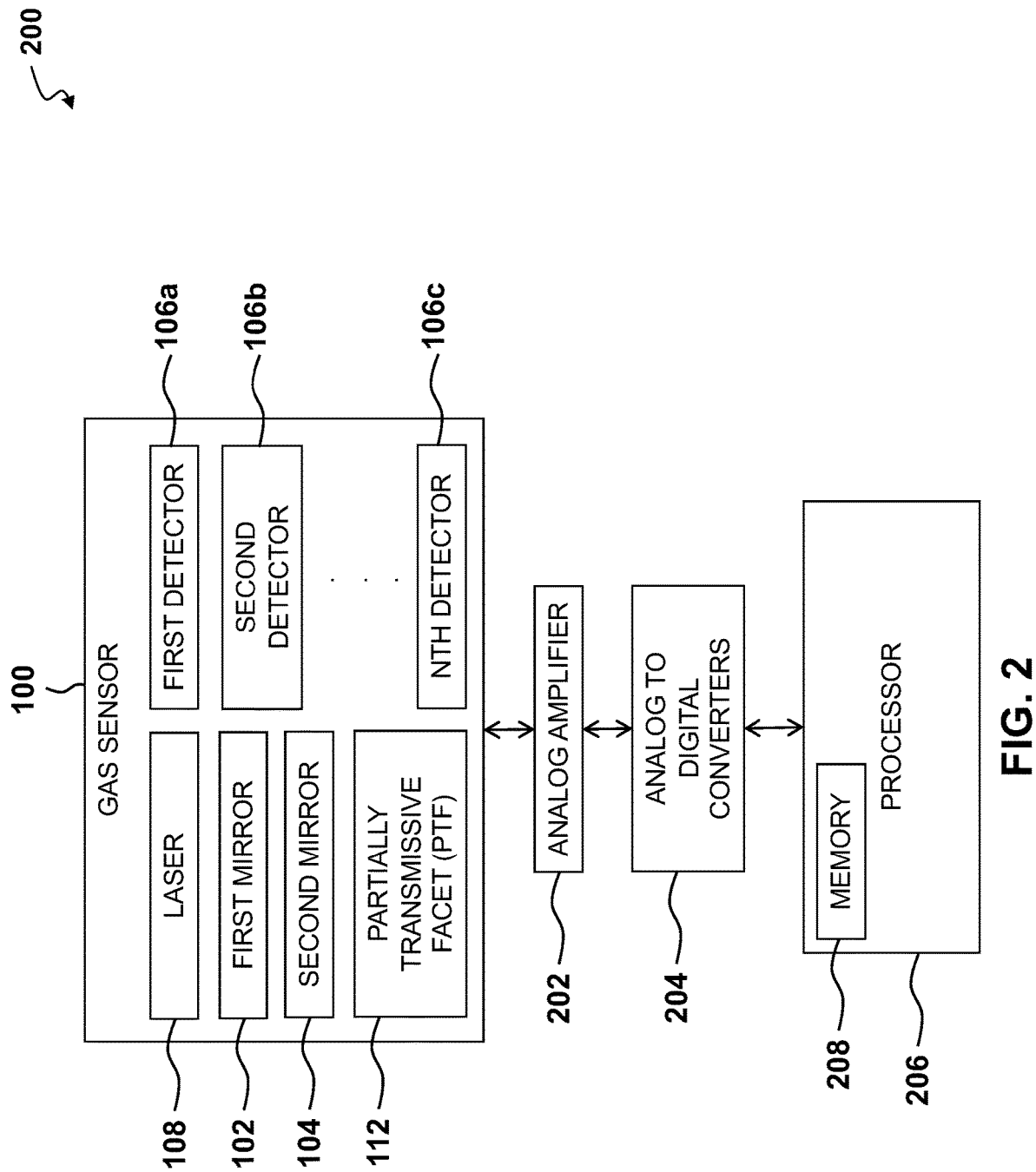
FIG. 2 depicts a high-level block diagram of a gas sensor system, according to one embodiment.

FIG. 2 depicts a high-level block diagram of a gas sensor system 200, according to one embodiment. The system may include gas sensor 100, an analog amplifier 202, analog to digital converters 204, and a processor 206 having addressable memory 208. The gas sensor 100 may include the laser 108, the first mirror 102, the second mirror 104, the partially transmissive facet (PTF) disposed in the first mirror 102 or the second mirror 104, and two or more detectors 106a, 106b, 106c. The two or more detectors may include a first detector 106a, a second detector 106b, and an Nth detector 106c. In some embodiments, only two detectors may be used. In other embodiments, the system 200 may use three or more detectors to increase the accuracy and/or dynamic range of the system 200 in detecting one or more gasses.

The two or more detectors 106a, 106b, 106c may output an analog signal based on the amount of light in the beam from the laser 108 that reaches each detector 106, 106b, 106c. The analog amplifier 202 may amplify these analog signals. The analog to digital converters 204 may then convert the amplified analog signals to digital signals. The processor having addressable memory 208 may receive the converted signals and determine whether a gas of one or more gases is present. The detected gasses may include hydrogen disulfide, methane, sulfur oxide, carbon dioxide, and/or nitrogen oxide.

Figure 3:
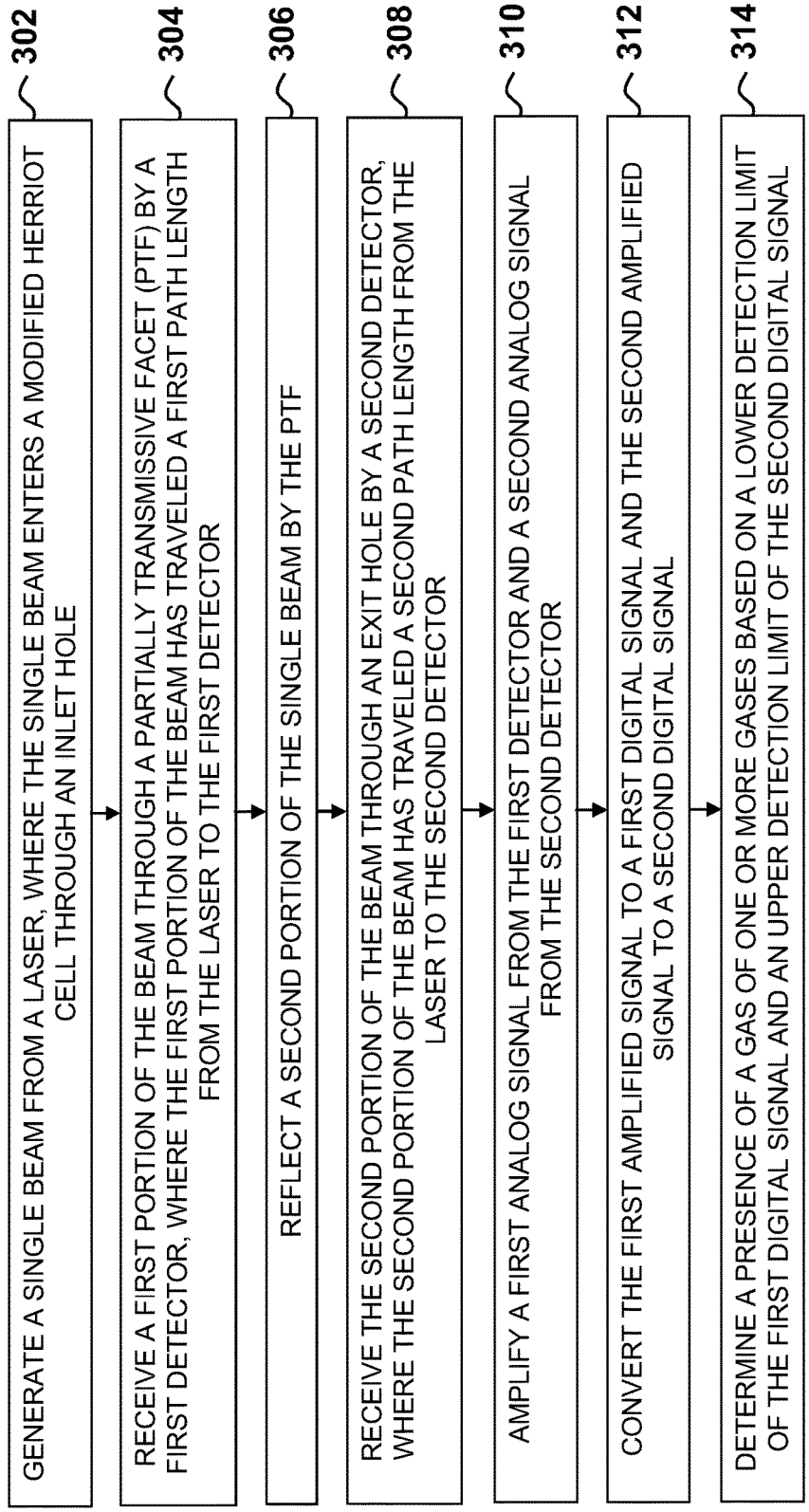
FIG. 3 depicts a high-level flowchart of a method embodiment of detecting gas via a gas sensor system using a modified Herriot cell, according to one embodiment.

FIG. 3 depicts a high-level flowchart of a method embodiment 300 of detecting gas via a gas sensor system using a modified Herriot cell, according to one embodiment. The method 300 may include generating a single beam from a laser, where the single beam may enter a modified Herriot cell through an inlet hole (step 302). The method 300 may then include receiving a first portion of the beam through a partially transmissive facet (PTF) by a first detector, where the first portion of the beam may have traveled a first path length from the laser to the first detector (step 304). The method 300 may then include reflecting a second portion of the single beam by the PTF (step 306). The method 300 may then include receiving the second portion of the beam through an exit hole by a second detector, where the second portion of the beam may have traveled a second path length from the laser to the second detector (step 308). The method 300 may then include amplifying a first analog signal from the first detector and a second analog signal from the second detector (step 309). The method 300 may then include converting the first amplified signal to a first digital signal and the second amplified signal to a second digital signal (step 310). The method 300 may then include determining a presence of a gas of one or more gases based on a lower detection limit of the first digital signal and an upper detection limit of the second digital signal (step 314).

Figure 4:
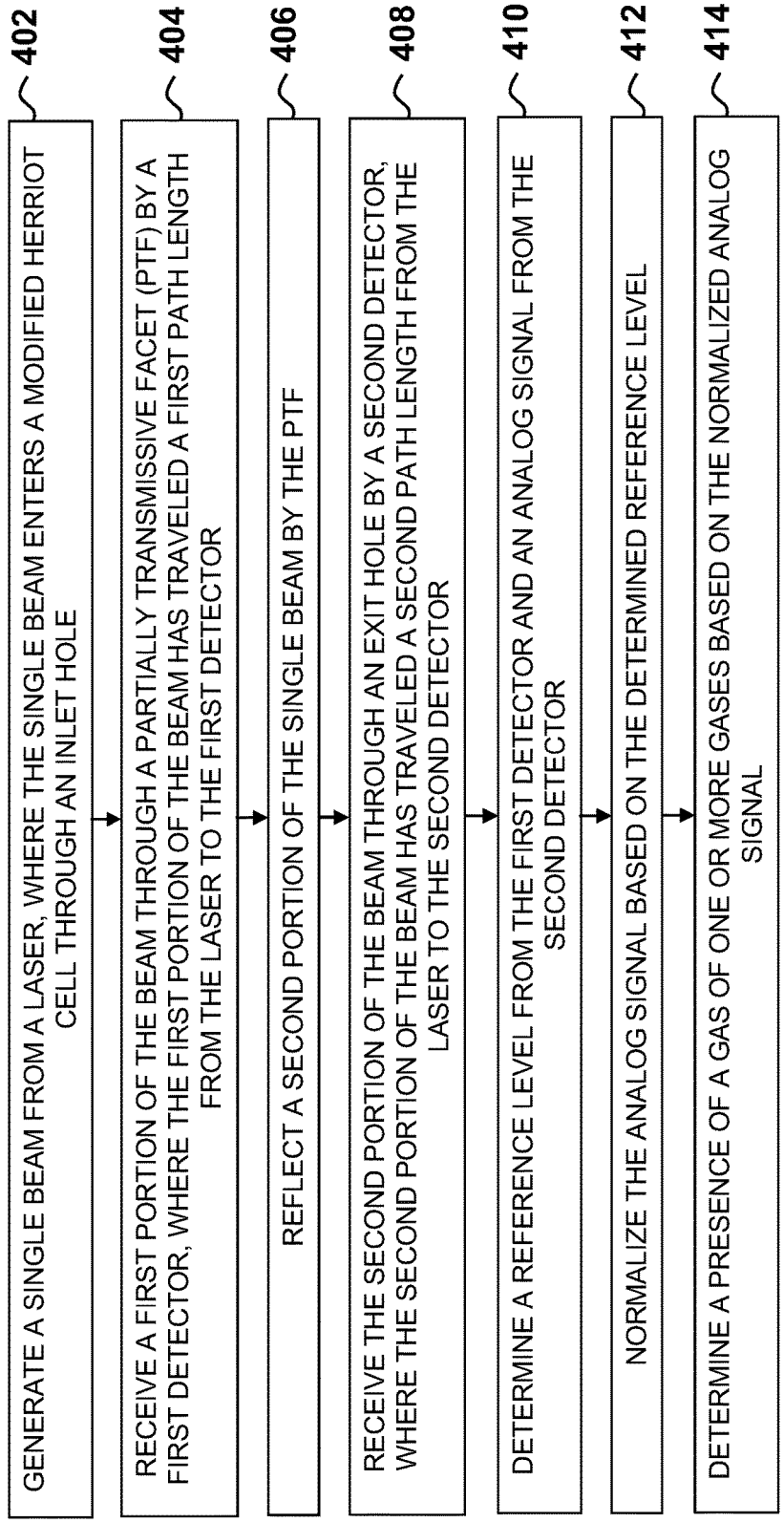
FIG. 4 depicts a high-level flowchart of an alternate method embodiment of detecting gas via a gas sensor system using a modified Herriot cell, according to one embodiment.

FIG. 4 depicts a high-level flowchart of an alternate method embodiment 300 of detecting gas via a gas sensor system using a modified Herriot cell, according to one embodiment. The method 400 may include generating a single beam from a laser, where the single beam may enter a modified Herriot cell through an inlet hole (step 402). The method 400 may then include receiving a first portion of the beam through a partially transmissive facet (PTF) by a first detector, where the first portion of the beam may have traveled a first path length from the laser to the first detector (step 404). The method 400 may then include reflecting a second portion of the single beam by the PTF (step 406). The method 400 may then include receiving the second portion of the beam through an exit hole by a second detector, where the second portion of the beam may have traveled a second path length from the laser to the second detector (step 408).

The method 400 may then include determining a reference level from the first detector and an analog signal from the second detector (step 410). In some embodiments, the first path length may be used as an independent reference path. In such an embodiment, the first path length may have little to no methane measurement portion. In some embodiments, two path length sensors may pass one path through the trace gas, while the reference path is passed through a cell that doesn't contain the gas. However, a short first path length relative to the measurement second path length can reasonably represent a background reference level. The method 400 may then include normalizing the analog signal based on the determined reference level (step 412). The method 400 may then include determining a presence of a gas of one or more gases based on the normalized analog signal (step 414). In some embodiments, determining the presence of the gas may include amplifying the normalized analog signal from the second detector and converting the amplified signal to a digital signal.

Figure 5:
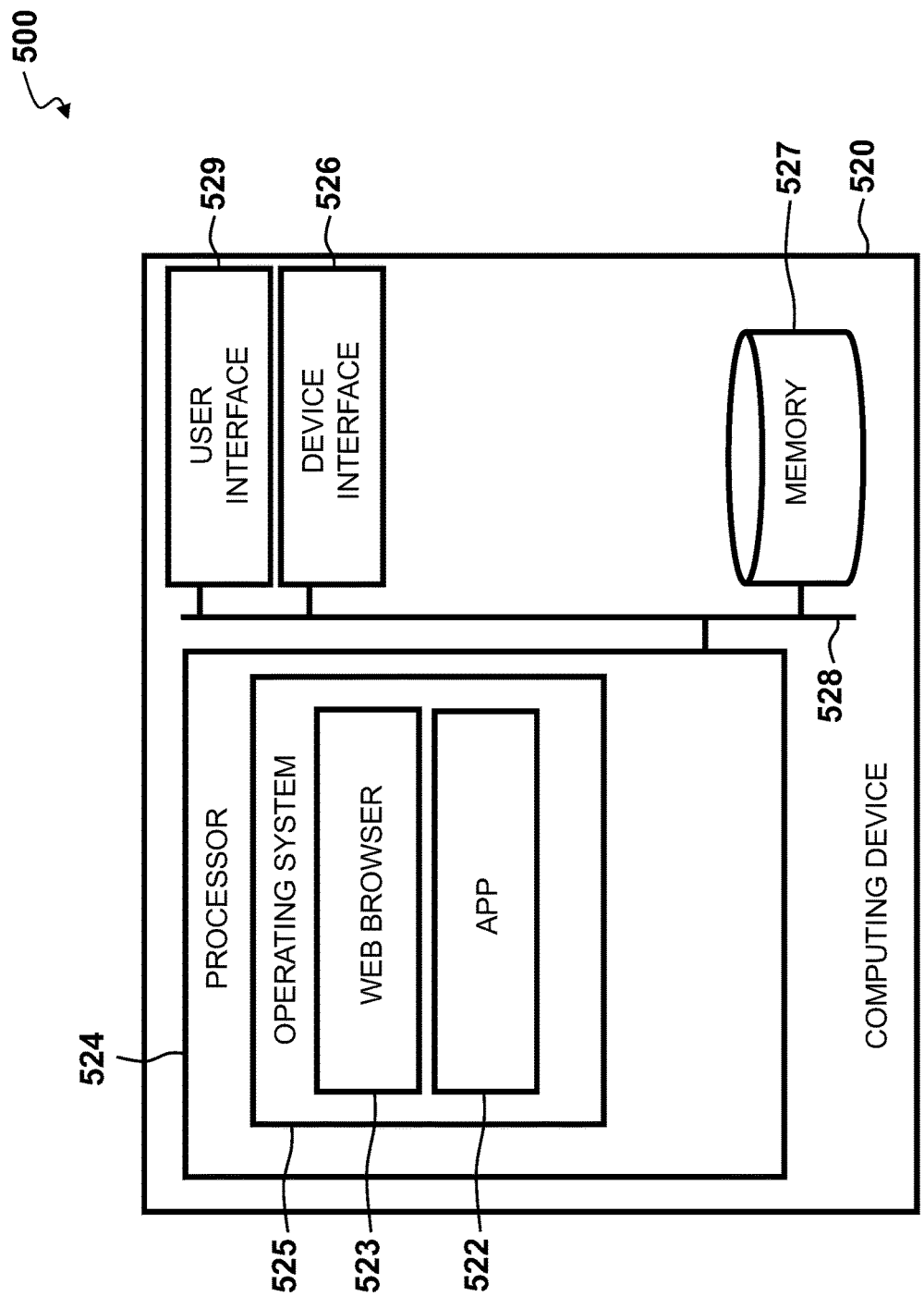
FIG. 5 illustrates an example top-level functional block diagram of a computing device embodiment.

FIG. 5 illustrates an example of a top-level functional block diagram of a computing device embodiment 500. The example operating environment is shown as a computing device 520 comprising a processor 524, such as a central processing unit (CPU), addressable memory 527, an external device interface 526, e.g., an optional universal serial bus port and related processing, and/or an Ethernet port and related processing, and an optional user interface 529, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 528. In some embodiments, via an operating system 525 such as one supporting a web browser 523 and applications 522, the processor 524 may be configured to execute steps of a process establishing a communication channel and processing according to the embodiments described above.

System embodiments include computing devices such as a server computing device, a buyer computing device, and a seller computing device, each comprising a processor and addressable memory and in electronic communication with each other. The embodiments provide a server computing device that may be configured to: register one or more buyer computing devices and associate each buyer computing device with a buyer profile; register one or more seller computing devices and associate each seller computing device with a seller profile; determine search results of one or more registered buyer computing devices matching one or more buyer criteria via a seller search component. The service computing device may then transmit a message from the registered seller computing device to a registered buyer computing device from the determined search results and provide access to the registered buyer computing device of a property from the one or more properties of the registered seller via a remote access component based on the transmitted message and the associated buyer computing device; and track movement of the registered buyer computing device in the accessed property via a viewer tracking component. Accordingly, the system may facilitate the tracking of buyers by the system and sellers once they are on the property and aid in the seller's search for finding buyers for their property. The figures described below provide more details about the implementation of the devices and how they may interact with each other using the disclosed technology.

Figure 6:
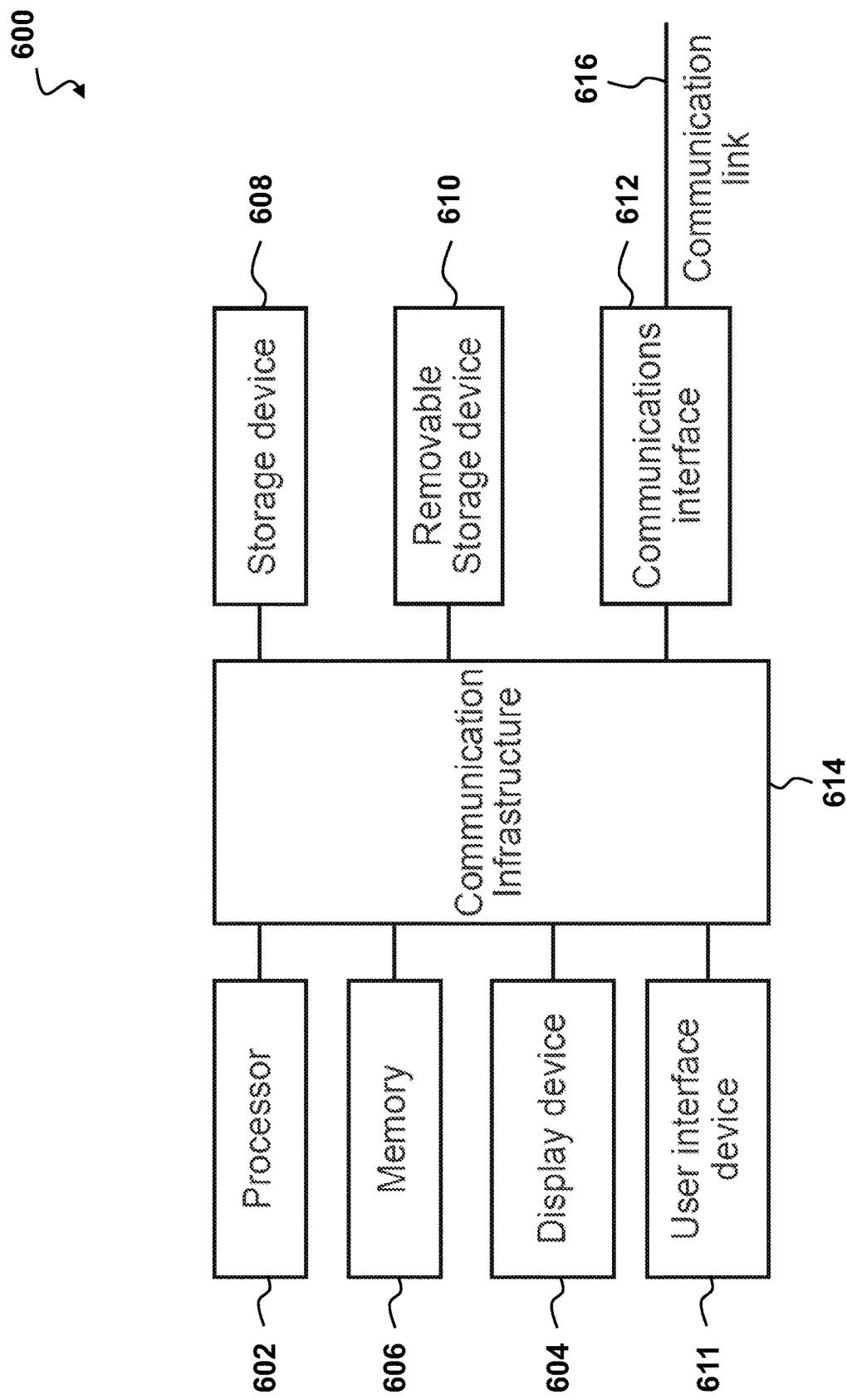
FIG. 6 shows a high-level block diagram and process of a computing system for implementing an embodiment of the system and process.

FIG. 6 is a high-level block diagram 600 showing a computing system comprising a computer system useful for implementing an embodiment of the system and process, disclosed herein. Embodiments of the system may be implemented in different computing environments. The computer system includes one or more processors 602, and can further include an electronic display device 604 (e.g., for displaying graphics, text, and other data), a main memory 606 (e.g., random access memory (RAM)), storage device 608, a removable storage device 610 (e.g., removable storage drive, a removable memory module, a magnetic tape drive, an optical disk drive, a computer readable medium having stored therein computer software and/or data), user interface device 611 (e.g., keyboard, touch screen, keypad, pointing device), and a communication interface 612 (e.g., modem, a network interface (such as an Ethernet card), a communications port, or a PCMCIA slot and card). The communication interface 612 allows software and data to be transferred between the computer system and external devices. The system further includes a communications infrastructure 614 (e.g., a communications bus, cross-over bar, or network) to which the aforementioned devices/modules are connected as shown.

Information transferred via communications interface 614 may be in the form of signals such as electronic, electromagnetic, optical, or other signals capable of being received by communications interface 614, via a communication link 616 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 612. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 7:
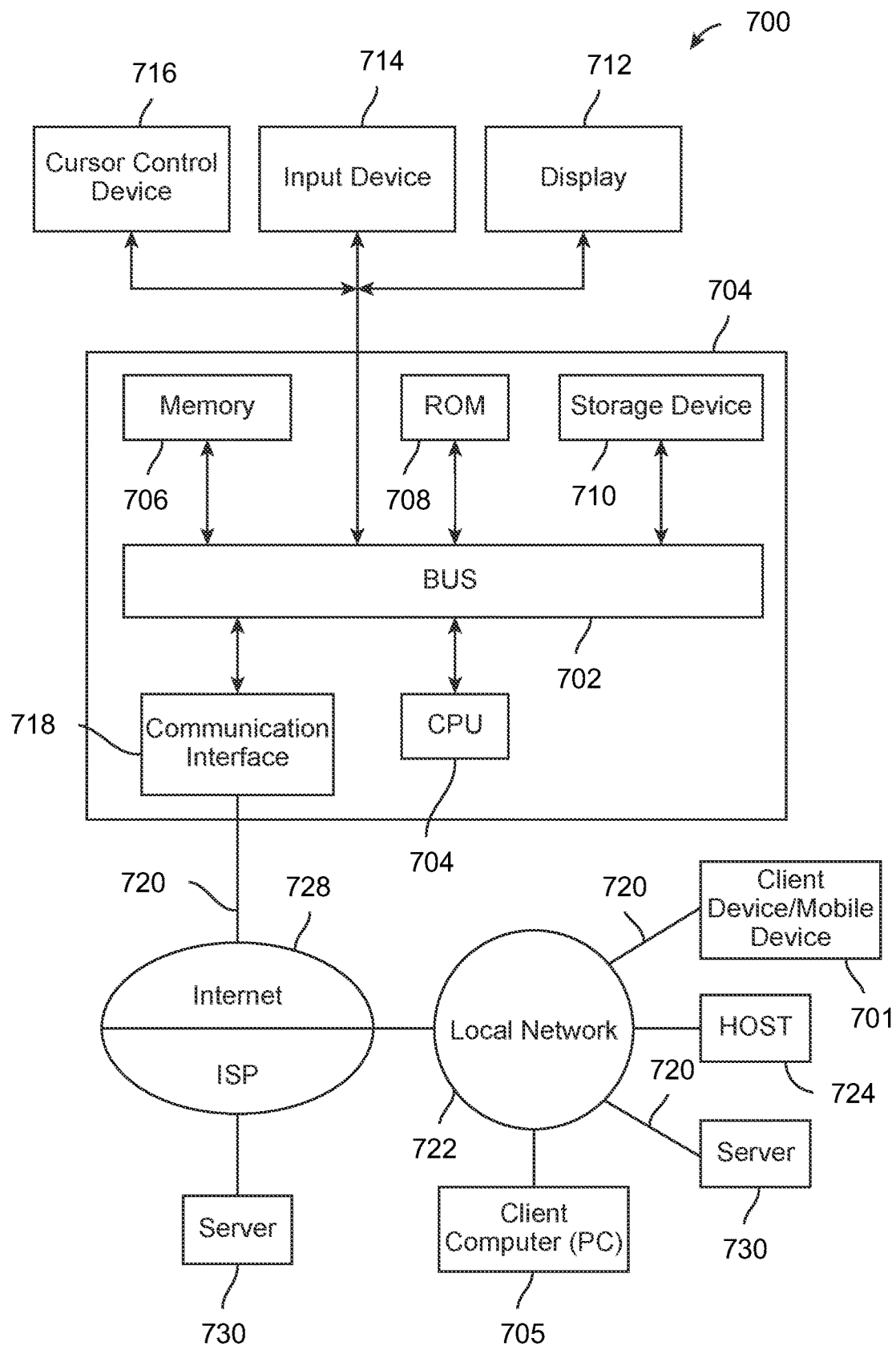
FIG. 7 shows a block diagram and process of an exemplary system in which an embodiment may be implemented.

FIG. 7 shows a block diagram of an example system 700 in which an embodiment may be implemented. The system 700 includes one or more client devices 701 such as consumer electronics devices, connected to one or more server computing systems 730. A server 730 includes a bus 702 or other communication mechanism for communicating information, and a processor (CPU) 704 coupled with the bus 702 for processing information. The server 730 also includes a main memory 706, such as a random access memory (RAM) or other dynamic storage device, coupled to the bus 702 for storing information and instructions to be executed by the processor 704. The main memory 706 also may be used for storing temporary variables or other intermediate information during execution or instructions to be executed by the processor 704. The server computer system 730 further includes a read only memory (ROM) 708 or other static storage device coupled to the bus 702 for storing static information and instructions for the processor 704. A storage device 710, such as a magnetic disk or optical disk, is provided and coupled to the bus 702 for storing information and instructions. The bus 702 may contain, for example, thirty-two address lines for addressing video memory or main memory 706. The bus 702 can also include, for example, a 32-bit data bus for transferring data between and among the components, such as the CPU 704, the main memory 706, video memory and the storage 710. Alternatively, multiplex data/address lines may be used instead of separate data and address lines.

The server 730 may be coupled via the bus 702 to a display 712 for displaying information to a computer user. An input device 714, including alphanumeric and other keys, is coupled to the bus 702 for communicating information and command selections to the processor 704. Another type or user input device comprises cursor control 716, such as a mouse, a trackball, or cursor direction keys for communicating direction information and command selections to the processor 704 and for controlling cursor movement on the display 712.

According to one embodiment, the functions are performed by the processor 704 executing one or more sequences of one or more instructions contained in the main memory 706. Such instructions may be read into the main memory 706 from another computer-readable medium, such as the storage device 710. Execution of the sequences of instructions contained in the main memory 706 causes the processor 704 to perform the process steps described herein. One or more processors in a multi-processing arrangement may also be employed to execute the sequences of instructions contained in the main memory 706. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 704 for execution. Such a medium may take many forms, including but not limited to, non-volatile media, volatile media, and transmission media. Non-volatile media includes, for example, optical or magnetic disks, such as the storage device 710. Volatile media includes dynamic memory, such as the main memory 706. Transmission media includes coaxial cables, copper wire and fiber optics, including the wires that comprise the bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 704 for execution. For example, the instructions may initially be carried on a magnetic disk of a remote computer. The remote computer can load the instructions into its dynamic memory and send the instructions over a telephone line using a modem. A modem local to the server 730 can receive the data on the telephone line and use an infrared transmitter to convert the data to an infrared signal. An infrared detector coupled to the bus 702 can receive the data carried in the infrared signal and place the data on the bus 702. The bus 702 carries the data to the main memory 706, from which the processor 704 retrieves and executes the instructions. The instructions received from the main memory 706 may optionally be stored on the storage device 710 either before or after execution by the processor 704.

The server 730 also includes a communication interface 718 coupled to the bus 702. The communication interface 718 provides a two-way data communication coupling to a network link 720 that is connected to the world wide packet data communication network now commonly referred to as the Internet 728. The Internet 728 uses electrical, electromagnetic or optical signals that carry digital data streams. The signals through the various networks and the signals on the network link 720 and through the communication interface 718, which carry the digital data to and from the server 730, are exemplary forms or carrier waves transporting the information.

In another embodiment of the server 730, interface 718 is connected to a network 722 via a communication link 720. For example, the communication interface 718 may be an integrated services digital network (ISDN) card or a modem to provide a data communication connection to a corresponding type of telephone line, which can comprise part of the network link 720. As another example, the communication interface 718 may be a local area network (LAN) card to provide a data communication connection to a compatible LAN. Wireless links may also be implemented. In any such implementation, the communication interface 718 sends and receives electrical electromagnetic or optical signals that carry digital data streams representing various types of information.

The network link 720 typically provides data communication through one or more networks to other data devices. For example, the network link 720 may provide a connection through the local network 722 to a host computer 724 or to data equipment operated by an Internet Service Provider (ISP). The ISP in turn provides data communication services through the Internet 728. The local network 722 and the Internet 728 both use electrical, electromagnetic or optical signals that carry digital data streams. The signals through the various networks and the signals on the network link 720 and through the communication interface 718, which carry the digital data to and from the server 730, are exemplary forms or carrier waves transporting the information.

The server 730 can send/receive messages and data, including e-mail, program code, through the network, the network link 720 and the communication interface 718. Further, the communication interface 718 can comprise a USB/Tuner and the network link 720 may be an antenna or cable for connecting the server 730 to a cable provider, satellite provider or other terrestrial transmission system for receiving messages, data and program code from another source.

The example versions of the embodiments described herein may be implemented as logical operations in a distributed processing system such as the system 700 including the servers 730. The logical operations of the embodiments may be implemented as a sequence of steps executing in the server 730, and as interconnected machine modules within the system 700. The implementation is a matter of choice and can depend on performance of the system 700 implementing the embodiments. As such, the logical operations constituting said example versions of the embodiments are referred to for e.g., as operations, steps or modules.

Similar to a server 730 described above, a client device 701 can include a processor, memory, storage device, display, input device and communication interface (e.g., e-mail interface) for connecting the client device to the Internet 728, the ISP, or LAN 722, for communication with the servers 730.

The system 700 can further include computers (e.g., personal computers, computing nodes) 705 operating in the same manner as client devices 701, where a user can utilize one or more computers 705 to manage data in the server 730.

Figure 8:
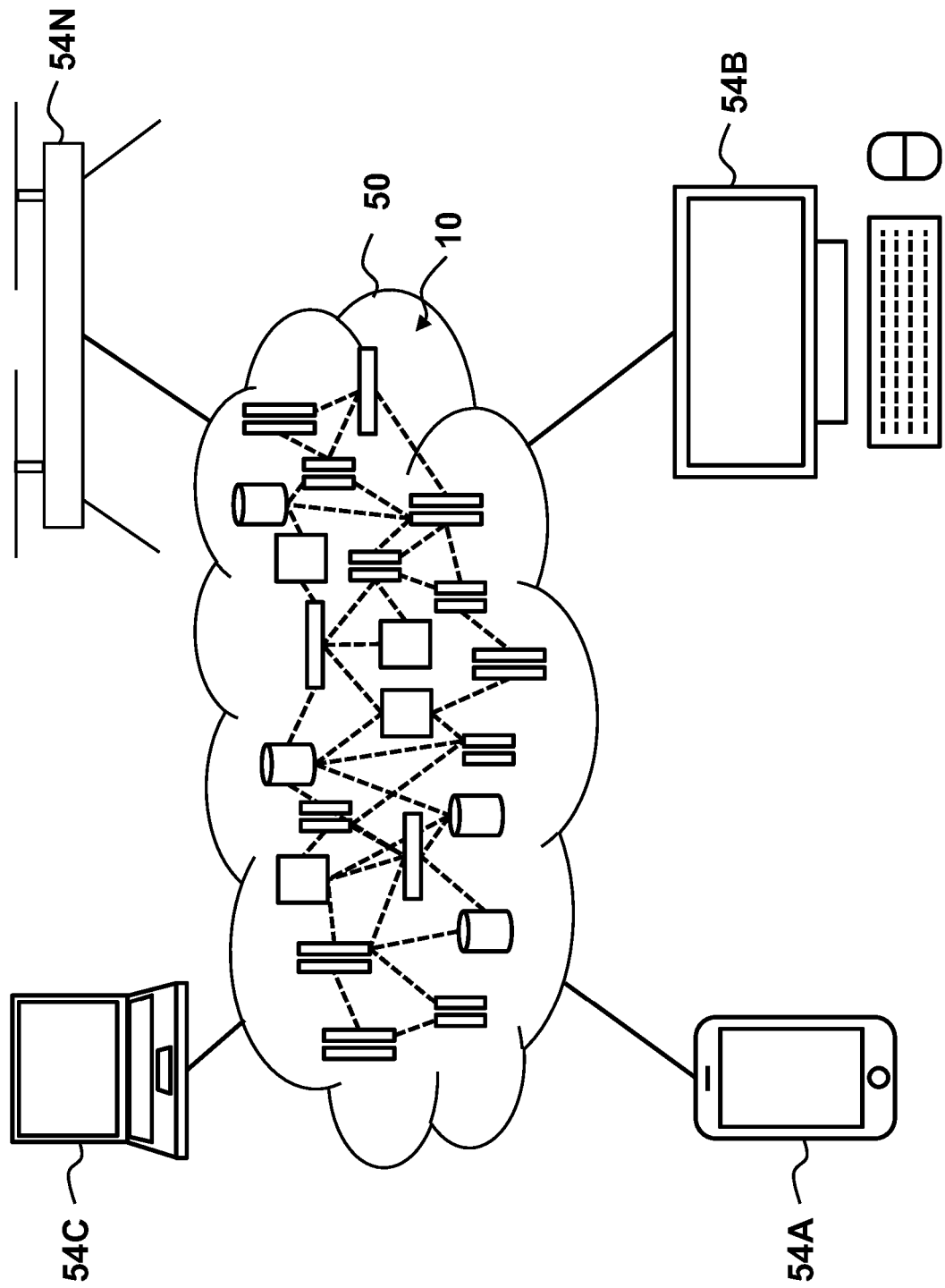
FIG. 8 depicts a cloud computing environment for implementing an embodiment of the system and process disclosed herein.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or unmanned aerial vehicle (UAV) 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
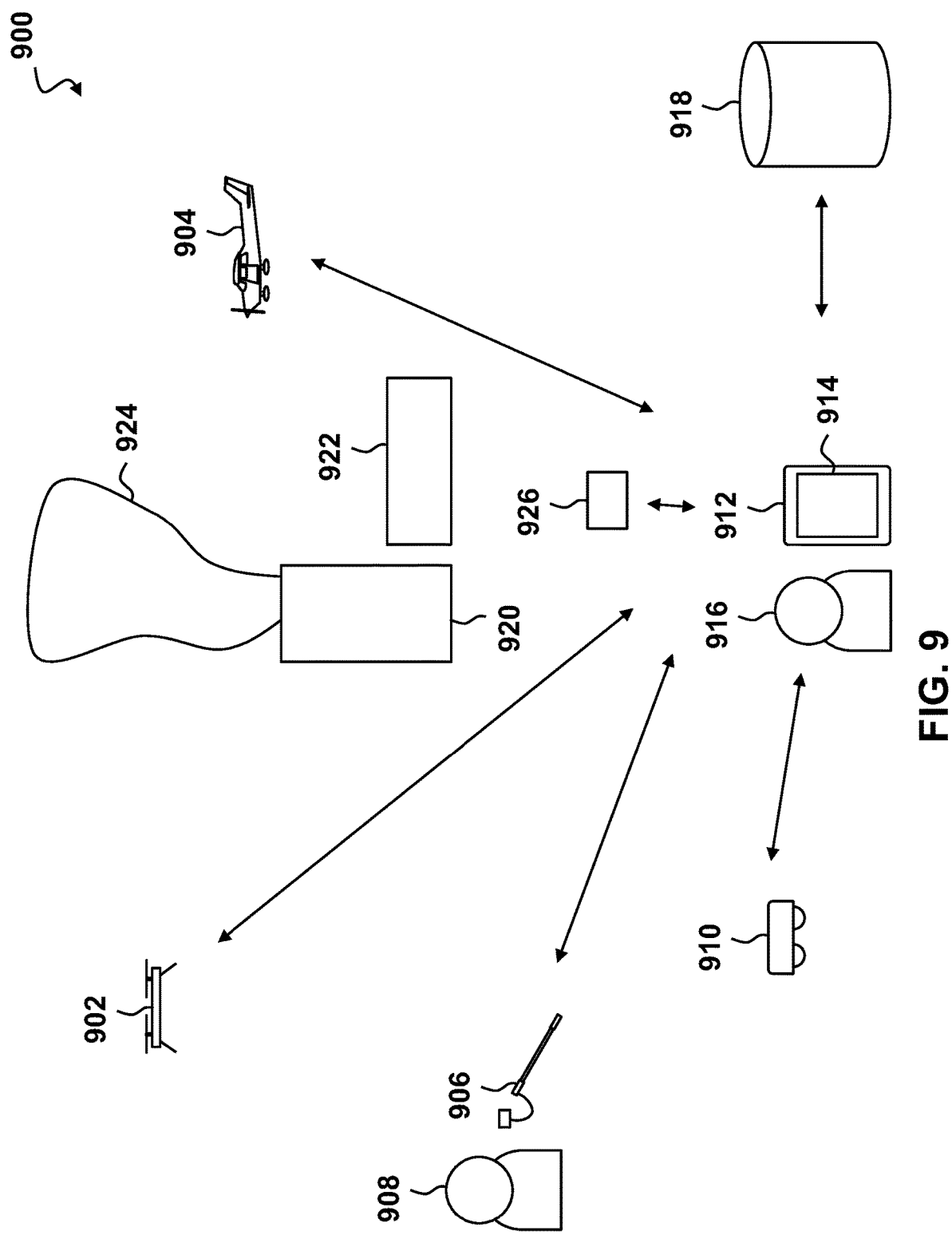
FIG. 9 depicts a system for detecting trace gasses, according to one embodiment.

FIG. 9 depicts a system 900 for detecting trace gasses, according to one embodiment. The system may include one or more trace gas sensors located in one or more vehicles 902, 904, 906, 910. The one or more trace gas sensors may detect elevated trace gas concentrations from one or more potential gas sources 920, 922, such as a holding tank, pipeline, or the like. The potential gas sources 920, 922 may be part of a large facility, a small facility, or any location. The potential gas sources 920, 922 may be clustered and/or disposed distal from one another. The one or more trace gas sensors may be used to detect and quantify leaks of toxic gases, e.g., hydrogen disulfide, or environmentally damaging gases, e.g., methane, sulfur dioxide) in a variety of industrial and environmental contexts. Detection and quantification of these leaks are of interest to a variety of industrial operations, such as oil and gas, chemical production, and painting. Detection and quantification of leaks is also of value to environmental regulators for assessing compliance and for mitigating environmental and safety risks. In some embodiments, the at least one trace gas sensor may be configured to detect methane. In other embodiments, the at least one trace gas sensor may be configured to detect sulfur oxide, such as SO, SO2, SO3, S7O2, S6O2, S2O2, and the like. A trace gas leak 924 may be present in a potential gas source 920. The one or more trace gas sensors may be used to identify the trace gas leak 924 and/or the source 920 of the trace gas leak 924 so that corrective action may be taken.

The one or more vehicles 902, 904, 906, 910 may include an unmanned aerial vehicle (UAV) 902, an aerial vehicle 904, a handheld device 906, and a ground vehicle 910. In some embodiments, the UAV 902 may be a quadcopter or other device capable of hovering, making sharp turns, and the like. In other embodiments, the UAV 902 may be a winged aerial vehicle capable of extended flight time between missions. The UAV 902 may be autonomous or semi-autonomous in some embodiments. In other embodiments, the UAV 902 may be manually controlled by a user. The aerial vehicle 904 may be a manned vehicle in some embodiments. The handheld device 906 may be any device having one or more trace gas sensors operated by a user 908. In one embodiment, the handheld device 906 may have an extension for keeping the one or more trace gas sensors at a distance from the user 908. The ground vehicle 910 may have wheels and/or treads in one embodiment. In other embodiments, the ground vehicle 910 may be a legged robot. In some embodiments, the ground vehicle 910 may be used as a base station for one or more UAVs 902. In some embodiments, one or more aerial devices, such as the UAV 902, a balloon, or the like, may be tethered to the ground vehicle 910. In some embodiments, one or more trace gas sensors may be located in one or more stationary monitoring devices 926. The one or more stationary monitoring devices may be located proximate one or more potential gas sources 920, 922. In some embodiments, the one or more stationary monitoring devices may be relocated.

The one or more vehicles 902, 904, 906, 910 and/or stationary monitoring devices 926 may transmit data including trace gas data to a ground control station (GCS) 912. The GCS may include a display 914 for displaying the trace gas concentrations to a GCS user 916. The GCS user 916 may be able to take corrective action if a gas leak 924 is detected, such as by ordering a repair of the source 920 of the trace gas leak. The GCS user 916 may be able to control movement of the one or more vehicles 902, 904, 906, 910 in order to confirm a presence of a trace gas leak in some embodiments.

In some embodiments, the GCS 912 may transmit data to a cloud server 918. In some embodiments, the cloud server 918 may perform additional processing on the data. In some embodiments, the cloud server 918 may provide third party data to the GCS 912, such as wind speed, temperature, pressure, weather data, or the like.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

The invention claimed is:

1. A system comprising:
a cell comprising:
 a laser configured to generate a single beam;
 a partially transmissive area (PTA) of at least one of: a first mirror and a second mirror, wherein a first portion of the single beam is received through the PTA, and wherein a second portion of the single beam is reflected by the PTA;
 a first detector disposed proximate the PTA, wherein the first detector receives the first portion of the beam, wherein the first portion of the beam has traveled a first path length from the laser to the first detector, and wherein the first detector is configured to output a first analog signal comprising an upper detection limit of a presence of a trace gas of one or more trace gases; and
 a second detector disposed proximate the exit hole, wherein the second detector receives the second portion of the beam, wherein the second portion of the beam has traveled a second path length from the laser to the second detector, and wherein the second detector is configured to output a second analog signal comprising a lower detection limit of the presence of the trace gas of the one or more trace gases;
 wherein the upper detection limit of the first analog signal and the lower detection limit of the second analog signal provides a high dynamic range (HDR) for detecting the presence of the trace gas of the one or more trace gases.

2. The system of claim 1, wherein the cell further comprises:
 an inlet hole disposed in at least one of: the first mirror and the second mirror.

3. The system of claim 2, wherein the laser is disposed proximate the inlet hole, and wherein the single beam passes through the inlet hole.

4. The system of claim 3, wherein the cell further comprises:
 an exit hole disposed in at least one of: the first mirror and the second mirror, wherein the single beam passes through the exit hole to the second detector.

5. The system of claim 1, wherein the PTA comprises a facet of at least one of: the first mirror and the second mirror.

6. The system of claim 1, further comprising:
 one or more analog amplifiers configured to amplify the first analog signal from the first detector and the second analog signal from the second detector.

7. The system of claim 6 further comprising:
 one or more analog to digital converters configured to convert the first amplified signal to a first digital signal and the second amplified signal to a second digital signal.

8. The system of claim 7, further comprising:
 a processor having addressable memory, the processor configured to:
 receive the first digital signal and the second digital signal; and
 determine a presence of the trace gas of the one or more trace gases based on an upper detection limit of the first digital signal and a lower detection limit of the second digital signal.

9. The system of claim 8, wherein the upper detection limit of the first digital signal and the lower detection limit of the second digital signal provides a high dynamic range (HDR) for detecting the presence of the trace gas of the one or more trace gases.

10. The system of claim 9, wherein the detected trace gas comprises at least one of: hydrogen disulfide, methane, sulfur oxide, carbon dioxide, and nitrogen oxide.

11. The system of claim 7, further comprising:
a processor having addressable memory, the processor configured to:
receive the first digital signal and the second digital signal;
determine a reference level from the first digital signal;
normalize the second digital signal based on the determined reference level; and
determine a presence of a trace gas of one or more trace gases based on the normalized second digital signal.

12. The system of claim 1, wherein an inner surface of the first mirror and an inner surface of the second mirror are concave.

13. The system of claim 1, wherein the first path length is shorter than the second path length.

14. The system of claim 1, wherein the first detector and the second detector are photodetectors.

15. A method comprising:
generating a single beam from a laser, wherein the single beam enters a cell through an inlet hole;
receiving a first portion of the beam through a partially transmissive area (PTA) by a first detector, wherein the first portion of the beam has traveled a first path length from the laser to the first detector, and wherein the first detector is configured to output a first analog signal comprising an upper detection limit of a presence of a trace gas of one or more trace gases;
reflecting a second portion of the single beam by the PTA; and
receiving the second portion of the beam through an exit hole by a second detector, wherein the second portion of the beam has traveled a second path length from the laser to the second detector, and wherein the second detector is configured to output a second analog signal comprising a lower detection limit of the presence of the trace gas of the one or more trace gases;
wherein the upper detection limit of the first analog signal and the lower detection limit of the second analog signal provides a high dynamic range (HDR) for detecting the presence of the trace gas of the one or more trace gases.

16. The method of claim 15 further comprising:
amplifying a first analog signal from the first detector and a second analog signal from the second detector via an analog amplifier.

17. The method of claim 16 further comprising:
converting the first amplified signal to a first digital signal and the second amplified signal to a second digital signal via analog to digital converters.

18. The method of claim 17 further comprising:
determining a presence of a trace gas of one or more trace gases based on a lower detection limit of the first digital signal and an upper detection limit of the second digital signal, wherein the upper detection limit of the first digital signal and the lower detection limit of the second digital signal provides a high dynamic range (HDR) for detecting the presence of the trace gas of the one or more trace gases.

19. A method comprising:
generating a single beam from a laser, wherein the single beam enters a cell through an inlet hole;
receiving one or more portions of the beam through one or more partially transmissive areas (PTA) by one or more detectors, wherein the one or more portions of the beam have traveled one or more path lengths from the laser to the one or more detectors;
determining one or more analog signals from the one or more detectors, wherein the one or more analog signals comprise one or more upper detection limits of a presence of a trace gas of one or more trace gases, wherein each of the one or more analog signals comprises a progressively lower upper detection limit as a path length of the traveled one or more path lengths increases;
reflecting a portion of the beam by the one or more PTA;
receiving a final portion of the beam through an exit hole by a final detector, wherein the final portion of the beam has traveled a final path length from the laser to the final detector, wherein the final detector is configured to output a final analog signal comprising a lower detection limit of the presence of the trace gas of the one or more trace gases; and
determining a final analog signal from the final detector, wherein the upper detection limits of the one or more analog signals and the lower detection limit of the final analog signal provides a high dynamic range (HDR) for detecting the presence of the trace gas of the one or more trace gases.

20. The method of claim 19, further comprising:
normalizing the analog signal based on a reference level;
determining the presence of the trace gas of one or more trace gases based on the normalized analog signal.

* * * * *